US009579974B2

(12) United States Patent
Bittlingmaier

(10) Patent No.: US 9,579,974 B2
(45) Date of Patent: Feb. 28, 2017

(54) STEERABLE WHEEL SIDE OF A DRIVE AXLE

(71) Applicant: Kessler & Co. GmbH & Co. KG, Abtsgmund (DE)

(72) Inventor: Gunter Bittlingmaier, Ebnat (DE)

(73) Assignee: Kessler & Co. GmbH & Co. KG, Abtsgmund (DE)

(*) Notice: Subject to any disclaimer, the term of this patent is extended or adjusted under 35 U.S.C. 154(b) by 0 days.

(21) Appl. No.: 14/780,744

(22) PCT Filed: Feb. 20, 2014

(86) PCT No.: PCT/EP2014/053277
§ 371 (c)(1),
(2) Date: Sep. 28, 2015

(87) PCT Pub. No.: WO2014/166662
PCT Pub. Date: Oct. 16, 2014

(65) Prior Publication Data
US 2016/0052389 A1    Feb. 25, 2016

(30) Foreign Application Priority Data

Apr. 12, 2013    (DE) .................. 10 2013 206 545

(51) Int. Cl.
*B60K 17/30*    (2006.01)
*B62D 7/18*    (2006.01)
(Continued)

(52) U.S. Cl.
CPC .......... *B60K 17/303* (2013.01); *B60B 35/003* (2013.01); *B60B 35/122* (2013.01);
(Continued)

(58) Field of Classification Search
None
See application file for complete search history.

(56) References Cited

U.S. PATENT DOCUMENTS 3,758,129 A * 9/1973 Ishikawa ................ B60G 7/005
180/259
3,963,260 A * 6/1976 Inbody .................... B60T 1/065
188/18 A (Continued)

FOREIGN PATENT DOCUMENTS

CN    101693438A A    4/2010
DE    3515417 A1    10/1986
(Continued)

OTHER PUBLICATIONS

Examination Report issued by the Chinese Patent Office on Nov. 28, 2016.

*Primary Examiner* — Tony Winner
(74) *Attorney, Agent, or Firm* — Dinsmore & Shohl LLP; Douglas W. Sprinkle

(57) ABSTRACT

The wheel side of a drive axle with wheel member steering having a drop center rim, preferably made of steel, is provided on the wheel hub and is combined with a disc brake, which is axially inwardly offset relative to the wheel plane and which preferably has compressed an actuation. The necessary space for the disc brake arrangement is guaranteed by the sufficiently low diameter of the wheel hub in the region of the brake disc and by a comparatively large axial space for the brake system, which is created by an axially narrow design of the wheel hub transmission and a by a new design of the steering knuckle bearing and of the pertaining axle guard.

15 Claims, 1 Drawing Sheet

(51) Int. Cl.
*B60K 17/04* (2006.01)
*B60B 35/00* (2006.01)
*B60B 35/12* (2006.01)
*B60B 35/16* (2006.01)
*F16D 65/12* (2006.01)
*F16D 65/02* (2006.01)

(52) U.S. Cl.
CPC .......... *B60B 35/163* (2013.01); *B60K 17/043* (2013.01); *B62D 7/18* (2013.01); *F16D 65/12* (2013.01); *F16D 65/123* (2013.01); *B60B 35/125* (2013.01); *B60K 17/046* (2013.01); *B60Y 2200/15* (2013.01); *B60Y 2200/416* (2013.01); *F16D 2065/134* (2013.01)

(56) References Cited

U.S. PATENT DOCUMENTS

| | | | | |
|---|---|---|---|---|
| 4,714,130 A | * | 12/1987 | Ujita | B60K 17/043 180/262 |
| 4,798,260 A | * | 1/1989 | Nakata | B60K 17/043 180/253 |
| 5,702,162 A | * | 12/1997 | Pressler | B60B 27/001 180/247 |
| 5,735,364 A | * | 4/1998 | Kinoshita | B60G 3/00 180/253 |
| 6,612,390 B2 | * | 9/2003 | Bennett | B60T 1/067 180/254 |
| 7,232,140 B2 | * | 6/2007 | Hamperl | B62D 7/18 280/124.113 |
| 8,572,615 B2 | * | 10/2013 | Inoue | G06F 9/522 709/248 |
| 8,863,874 B2 | * | 10/2014 | Lee | B60K 7/0007 180/65.51 |

FOREIGN PATENT DOCUMENTS

| | | |
|---|---|---|
| DE | 3935114 A1 | 5/1990 |
| DE | 102004043287 A1 | 3/2006 |
| EP | 0562122 A1 | 9/1993 |

* cited by examiner

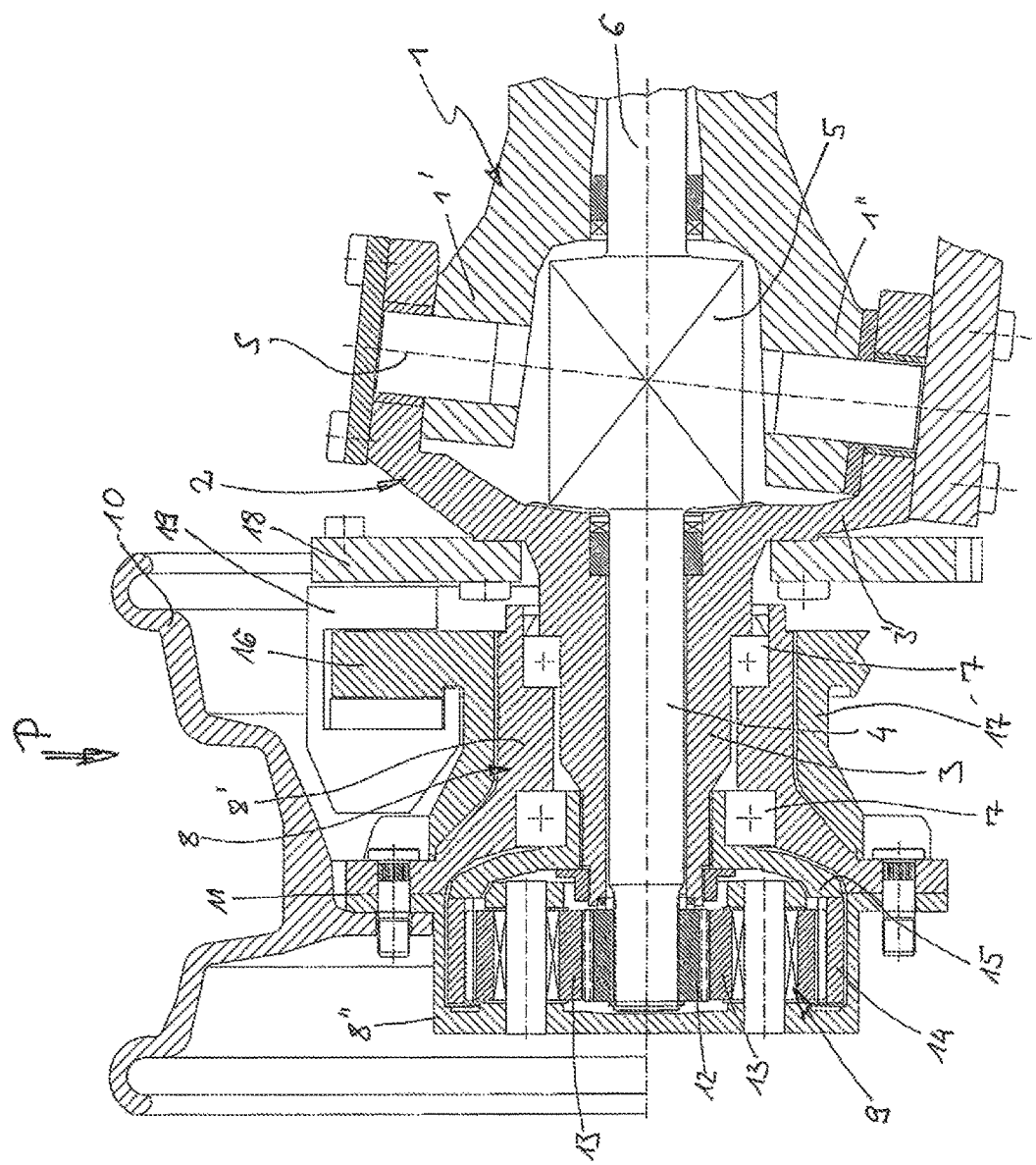

STEERABLE WHEEL SIDE OF A DRIVE AXLE

CROSS-REFERENCE TO RELATED APPLICATIONS

This application is the U.S. National Phase of PCT/EP2014/053277 filed Feb. 20, 2014, which claims priority of German Patent Application 10 2013 206 545.0 filed Apr. 12, 2013.

BACKGROUND OF THE INVENTION

Field of the Invention

The invention relates to steerable wheel sides of a drive axle for heavy crane vehicles or the like, having a knuckle support which is arranged in a steerable manner at an axle guard of a middle axle section and which has a knuckle axially passed through by a drive shaft part, at which a wheel hub and/or a hub carrier having a wheel hub gear is rotatably supported, with the wheel hub gear being drive-connected to the drive shaft part at an input side.

Description of the Prior Art

Axles which are configured as drive axles and which have Ackermann steering for heavy freight vehicles and/or special-purpose vehicles regularly have steerable wheel sides of the initially named kind.

Such axles are inter alia used for heavy vehicles, for example for crane vehicles, usually with 25 inch tires. In this respect, multi-part rims have so far been required its order to be able to mount the tires typical of such vehicles, on the one hand, and to be able to provide sufficient construction space for the brake system, on the other hand. Since the axle loads which are permissible in road traffic are limited, powertrains, with a small weight are generally aimed for. Having regard to weight-critical cases of application, expensive, dismantable aluminum rims are customary in this connection. This is where the invention comes in, in that it is proposed not to replace the customary multi-part steel rims with multi-part aluminum rims in case of weight problems, but rather with integrally formed drop center rims which can also be composed of steel in cases that are weight-critical. In addition to a substantial cost advantage, such rims provide the advantage of a particularly high robustness which is desirable above all in rough conditions of use.

However, the use of drop center steel rims has previously failed in that the spatial conditions at a drive axle having Ackermann steering does not permit the use of disk brakes (preferably actuated by compressed air). This is because in contrast to the multi-part dismantable rims which can have a very flat rim base due to their dismantling capability, a sufficient accommodation space for disk brakes dimensioned in accordance with the conditions of use of the respective vehicles is not available radially within the drop center steel rims, with the additional difficulty that the customary 25 inch tires require a particularly deep drop center for their mounting.

SUMMARY OF THE INVENTION

For this reason, it is the object of the invention to provide new wheel sides for driven axles having Ackermann steering, with the wheel sides permitting the combination of disk brakes and drop center steel rims (for the previously customary 25 inch tires).

This object is satisfied in accordance with the invention in that a wheel flange dimensioned for an integrally formed drop center rim and a drop center rim which can be screwed to the wheel flange are provided at the wheel hub and in that, within an axial range having a diameter which is small in comparison with the diameter of the wheel hub gear, the wheel hub has a brake disk which is axially displaced towards the axle guard with respect to the drop center rim and which cooperates with a service brake which is axially screwed to the knuckle support.

The invention is based on the recognition that the price advantage of steel drop center rims with respect to multi-part aluminum rims can overcompensate possible cost disadvantages in the axle construction and that a sufficient accommodation space for suitable pneumatic disk brakes can be provided at the wheel side on a reduction of the diameter of the wheel hub in the region between the rim and the axle guard.

In accordance with a particularly preferred embodiment of the invention, it is provided that a brake anchor plate, to which a brake caliper, preferably two brake calipers, is or are axially screwed, is axially screwed to a wall of the knuckle cap of the knuckle support, with the wall being axially adjacent to the joint connection and the knuckle cap being pivotably connected to the axle guard. An axial screw connection is understood such that the screw longitudinal axis is aligned (approximately) in parallel with the wheel axle. The brake anchor plate can be arranged at a flange surface orthogonal with respect to the axis of the knuckle at the outer side of the aforesaid knuckle cap. An arrangement is hereby advantageously possible in which the brake caliper or the brake calipers can be mounted at, the brake anchor plate from the wheel side.

It is furthermore advantageous when the axle guard spacing is dimensioned in accordance with a size which substantially corresponds to the cross-section or the spatial requirement of the joint connection between the shaft part passing through the knuckle and a drive shaft arranged in the middle axle section.

On an actuation of the steering, the knuckle pivots in a conventional manner about a pivot axis which is slightly inclined with respect to the vertical (so-called spreading of the pivot axes) and which moves away from the wheel plane in an upward direction and approaches the wheel plane in a downward direction. This has the consequence that the vertically lower end of the axle guard can restrict the possible construction space for the brake system and can restrict the brake anchor plate, as the lower end of the axle guard has a smaller spacing from the wheel plane, the deeper it is arranged. In that the lower end of the axle guard is now provided as high as possible in accordance with the preferred embodiment of the invention, this means at an upper position at which the connecting joint is still given sufficient space, it is ensured that the axle guard cannot form an interfering contour for the arrangement of the brake.

As a result, it is achieved in this manner that the flange surface provided at the knuckle support is (sufficiently) spaced apart from both ends of the axle guard for the mounting of the brake anchor plate.

Provision is in addition preferably made such that the axle guard and the knuckle cap pivotably connected thereto are configured narrow in a vertical plan view of the wheel side and/or of the drive axle in such a way that, on the one hand, large steering angles (>40°) can be achieved and at the same time (in a vertical plan view) component parts of the brake system (at the brake anchor plate) can still be arranged besides the knuckle cap.

Furthermore, it is expediently provided to configure the wheel hub gear as axially narrow such that the hub part receiving the wheel hub gear cannot form any interfering contour projecting axially far beyond the wheel plane. For the rest, the possible axial construction space for the brake system between the wheel and the axle guard is also increased by means of this measure.

It is preferably provided for the dimensioning of the brake disk that the brake disk diameter approximately corresponds to the vertical outer dimension of the knuckle support. On the one hand, an arrangement of the brake system protected to the greatest possible extent between the wheel and the axle guard is in this way possible; on the other hand, the necessary and/or desirable braking forces can also be ensured particularly since a double arrangement of the brake calipers is made possible with this dimensioning.

With respect to preferred features of the invention, reference is made in another respect to the claims and to the following description of an advantageous embodiment by means of the drawing.

The features shown can also be essential to the invention in a combination deviating from the drawn illustration, optionally also as individual features.

BRIEF DESCRIPTION OF THE DRAWING

In the drawing, the sole FIGURE shows an axial section of a wheel side in accordance with the invention.

DETAILED DESCRIPTION OF THE INVENTION

In accordance with the drawing, the invention relates to a drive axle having Ackermann steering. In this respect, a middle section of the axle, which as a rule comprises the respective axle differential, has an axle guard at its two ends, the axle guard having an upper guard end 1' and a lower guard end 1", at which ends a knuckle support 2 having a knuckle 3 connected in one piece to a knuckle cap 3' is arranged in a steerable manner about a pivot axis S predefined by the guard ends 1' and 1". The knuckle 3 is configured as a hollow body and receives a drive shaft part 4 in an axial central bore, with the drive shaft part being connected drive-wise to a drive shaft 6 arranged in the middle axle section via a joint connection 5 arranged in a free space between the knuckle cap 3' and the guard ends 1' and 1". A wheel hub arrangement 8 is rotatably supported at the knuckle 3 by means of roller element bearings, in particular cone bearings 7, and is in a drive connection with the drive shaft part 4 via a wheel hub gear 9. A drop center rim 10 preferably composed of steel is arranged at the wheel hub arrangement 8. The wheel hub arrangement 8 comprises an axially inner housing part 8' which is rotatably supported at the roller element bearings or at the cone bearings 7 and whose outer periphery tapers conically in the direction of the joint connection 5. The inner housing part 8' expands axially outward to the diameter of a wheel flange 11 which is provided for the mounting of the drop center rim 10 and which is configured as a double-wall flange, with the axially inner wall being configured as a part of the inner housing part 8' and the axially outer wall being configured as a part of an axially outer housing part 8" which receives the wheel hub gear 9.

This wheel hub gear 9 can be configured as a single-stage planetary gear, with the axially outer end of the drive shaft part 4 supporting a sun gear 12 which is arranged with a corresponding inner toothed arrangement at a matching outer toothed arrangement of the drive shaft part 4 in a shape-matched and/or a rotationally fixed manner. This sun gear 12 meshes with planetary gears 13 which are rotationally supported at corresponding axle bolts at the outer housing part 8" configured as a planetary gear carrier. The planetary gears 13 further mesh with an annulus gear 14 which is arranged in the outer housing part 8" and which is rotationally fixedly connected to the knuckle 3 via an annulus carrier 15 in a generally known manner. For this purpose, the annulus carrier engages with an inner peripheral toothed arrangement into a corresponding outer toothed arrangement at the knuckle 3 in a shape-matched manner and engages with an outer peripheral toothed arrangement into a or into the inner peripheral toothed arrangement of the annulus gear 14.

The annulus carrier 15 has a key-like shape which is adapted to the conical shape of the inner housing part 8' approximate to the wheel flange 11.

A brake disk 16 is furthermore arranged at the wheel flange 11 by means of a sleeve-shaped brake disk plate 17 which is connected to the brake disk and which is radially spaced apart from the axially inner housing part 8' by an air gap. A thermal insulation of the brake disk 16 with respect to the housing part 8' is thereby ensured and it is in particular avoided that seals, which are radially arranged between the knuckle 3 and the housing part 8', could be thermally destroyed.

The brake disk is preferably configured as a thick solid disk which, on "violent brakings" briefly following one another, is able to take up large amounts of heat with a corresponding heating without losses with regard to its mechanical stability and is in this respect advantageous with respect to an internally ventilated brake disk.

In the example shown, the brake disk 16 is arranged, in the axial direction of the wheel hub arrangement 8, in approximately the same plane as the axially inner roller element bearing or axially inner cone bearing 7. The brake caliper associated with the brake disk 16 or the associated caliper can be arranged double for ensuring very high braking torques, with a brake anchor plate or a caliper bracket 18 at a flange surface at the outer side of the knuckle cap 3' serving for fastening a service brake cooperating with the brake disk 16. In order to be able to ensure a sufficient construction space for the brake calipers, the wall of the axle cap 3' comprising the brake anchor plate or the caliper bracket 18 is approximated as far as possible to the joint connection 5. A sufficient free space for the brake calipers and for the brake component parts on steering movements of the knuckle 3 is simultaneously ensured by a particularly narrow configuration of the axle guard 1 and of the knuckle cap 3' on a view in the direction of arrow P:

The lower end 1" of the axle guard 1 has a position vertically approximated to the joint connection 5 such that, due to the inclined pivot axis S, the lower end 1" is positioned at a position maximally spaced apart from the wheel plane and cannot form any interfering contour for braking members.

It becomes clear from the drawing that the following features are of particular importance for the combination provided in accordance with the invention of a drop center rim with a disk brake arrangement at a wheel side of a drive axle having Ackermann steering:

Between the wheel plane and the facing side of the knuckle support, the wheel hub arrangement 8 has a considerably reduced diameter in comparison with the wheel hub gear 9, wherein such a design of the wheel hub arrangement is facilitated by a knuckle 3 having a small diameter and by roller element bearings or cone bearings 7 having a reduced radial height.

Furthermore, an as large as possible axial spacing should be present between the wheel plane and the side facing the knuckle support 2. This is, on the one hand, facilitated by a wheel hub gear 9 which is axially narrow in construction and which can be provided at the outer wheel side without formation of an impermissible interfering contour due to its narrow design. The cap 3' of the knuckle support 2 is furthermore approximated as far as possible to the joint connection 5 between the drive shaft 6 and the drive shaft part 4, wherein the plane of the outer side of the knuckle cap 3' which is usable as a flange surface also remains free of interfering contours in the region of the lower end 1" of the axle guard 1 when the lower end 1" of the axle guard 1 is vertically approximated as far as possible to the joint connection 5.

Increased forces and/or torques then indeed arise at the guard ends with respect to axle guards having a larger guard spacing, but are able to be easily controlled by means of a corresponding selection of material and dimensioning.

In addition, it can be clearly seen from the drawing that the brake anchor plate or the caliper bracket 18 can be axially screwed to the knuckle cap 3 and the brake calipers 19 can be axially screwed to the brake anchor plate or the caliper bracket 18. This facilitates a double arrangement of the brake calipers.

Overall it must be stated that a possibly increased manufacturing or constructive demand in effort and cost at the wheel side is overcompensated by the price advantages of a steel drop center rim 10, whose use becomes possible in a simple manner by means of the invention with a further advantage being gained in that a steel drop center rim is considerably more robust, with comparable weight advantages, than previously customary multi-part aluminum rims. A weight advantage is furthermore achieved.

REFERENCE NUMERAL LIST 1 axle guard
1', 1" upper guard end, lower guard end
2 knuckle bearing
3 knuckle
3' knuckle cap
4 drive shaft part
5 joint connection
6 drive shaft
7 roller element bearing or cone bearing
8 wheel hub arrangement
8', 8" axial inner housing part, axially outer housing part
9 wheel hub gear
10 drop center rim
11 wheel flange
12 sun gear
13 planetary gears
14 annulus gear
15 annulus carrier
16 brake disk
17 brake disk plate
18 brake anchor plate or caliper bracket
19 brake caliper
S pivot axis
P direction of arrow

The invention claimed is:

1. A steerable wheel side of a drive axle comprising:
a knuckle support arranged in a steerable manner at an axle guard of a middle axle section and which has a knuckle, wherein a drive shaft part axially passes through the knuckle, wherein a wheel hub arrangement is rotatably supported at an end of the knuckle, wherein the wheel hub arrangement has a wheel hub gear which is drive-connected to the drive shaft part at an input side and which has a diameter,
said wheel hub arrangement having a wheel flange which is adapted to receive an integrally formed drop center rim for threaded attachment to the wheel flange, the wheel hub arrangement having an axially inner region which is axially located between the wheel hub gear and the axle guard and which has a diameter which is smaller than the diameter of the wheel hub gear,
wherein the wheel hub arrangement has a brake disk which is axially located in the axially inner region of the wheel hub arrangement, wherein the brake disk cooperates with a service brake which is axially threadably attached to the knuckle support, and
a brake anchor plate for holding a brake caliper associated with the brake disk, wherein the knuckle support comprises a knuckle cap, and wherein the brake anchor plate is fasten at a wall of the knuckle cap of the knuckle support.

2. The steerable wheel side in accordance with claim 1, wherein a drop center rim which is made of steel.

3. The steerable wheel side in accordance with claim 1, wherein an outer diameter of the brake disk approximately corresponds to a vertical outer dimension of the knuckle support.

4. The steerable wheel side in accordance with claim 1, wherein the brake anchor plate is arranged at a flange surface of the wall of the knuckle cap, the flange surface being orthogonal with respect to an axis of the knuckle.

5. The steerable wheel side in accordance with claim 4, wherein the brake anchor plate is formed as a flange plate extended orthogonally to the axis of the knuckle.

6. The steerable wheel side in accordance with claim 1, further comprising a joint connection between the drive shaft part passing through the knuckle and a drive shaft of said middle axle section, wherein the axle guard comprises two guard ends, and wherein a spacing between the two guard ends substantially corresponds to a cross-section of said joint connection.

7. The steerable wheel side in accordance with claim 6, further comprising a brake anchor plate for holding a brake caliper associated with the brake disk, wherein the brake anchor plate is spaced apart from the two guard ends of the axle guard.

8. The steerable wheel side in accordance with claim 1, wherein the wheel hub gear is arranged at an axially outer side of the wheel hub arrangement.

9. The steerable wheel side in accordance with claim 1, wherein the brake disk is arranged at an axially inner side of the wheel flange, by means of a sleeve-shaped brake disk carrier.

10. The steerable wheel side in accordance with claim 9, wherein the wheel hub arrangement comprises at least one housing part, and wherein the sleeve-shaped brake disk carrier is radially spaced apart from the at least one housing part by a ring-shaped air gap.

11. A steerable wheel side arrangement of a drive axle, comprising:
an axle guard;
a knuckle support which is provided in a steerable manner at the axle guard and which comprises a knuckle section;

a drive shaft part which axially extends through the knuckle section;

a wheel hub arrangement comprising a wheel flange adapted to receive a drop center rim, further comprising an inner housing part which is axially located between the wheel flange and the axle guard and which is rotatably supported at the knuckle section, and comprising a brake disk;

a wheel hub gear having an outer diameter and comprising an input member drive-connected to the drive shaft part and an output member drive-connected to the wheel hub arrangement; and at least one brake assembly which cooperates with the brake disk and which is axially screwed to the knuckle support;

wherein the inner housing part of the wheel hub arrangement has an outer diameter which is smaller than the outer diameter of the wheel hub gear; and wherein the brake disk is axially located between the wheel flange and the axle guard.

12. The steerable wheel side in accordance with claim 11, wherein the wheel hub gear comprises a single-stage planetary gear set.

13. The steerable wheel side in accordance with claim 11, wherein the at least one brake assembly comprises a brake anchor plate which is axially screwed to the knuckle support and at least one brake caliper which is axially screwed to the brake anchor plate.

14. The steerable wheel side in accordance with claim 11, wherein the brake disk is connected to the wheel flange by means of a sleeve-shaped brake disk carrier which surrounds the inner housing part of the wheel hub arrangement.

15. The steerable wheel side in accordance with claim 11, wherein the wheel hub gear is arranged at an axially outer side of the wheel flange relative to the brake disk.

* * * * *